(12) United States Patent
Dwari et al.

(10) Patent No.: US 11,840,423 B2
(45) Date of Patent: Dec. 12, 2023

(54) HYBRID ENERGY STORAGE SYSTEM ARCHITECTURES

(71) Applicant: Otis Elevator Company, Farmington, CT (US)

(72) Inventors: Suman Dwari, Vernon, CT (US); Stephen Savulak, Woodbury, CT (US); Enrico Manes, Feeding Hills, MA (US); Ronnie E. Thebeau, Haddam, CT (US); Xin Wu, Glastonbury, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 16/713,979

(22) Filed: Dec. 13, 2019

(65) Prior Publication Data

US 2020/0189883 A1  Jun. 18, 2020

Related U.S. Application Data

(60) Provisional application No. 62/779,731, filed on Dec. 14, 2018.

(51) Int. Cl.
*H04L 12/931* (2013.01)
*H04L 29/08* (2006.01)
(Continued)

(52) U.S. Cl.
CPC .......... *B66B 11/0226* (2013.01); *H02J 7/345* (2013.01); *H02J 50/12* (2016.02); *H02J 2207/20* (2020.01)

(58) Field of Classification Search
CPC .......... B66B 1/00; B66B 1/06; B66B 1/0006; B66B 13/14; B66B 2201/00; B66B 25/00;
(Continued)

(56) References Cited

U.S. PATENT DOCUMENTS 6,742,630 B2   6/2004  Eilinger
7,246,686 B2   7/2007  Smith et al.
(Continued)

FOREIGN PATENT DOCUMENTS

CN       1845417 A    10/2006
CN     102001557 A     4/2011
(Continued)

OTHER PUBLICATIONS

European Search Report for Application No. 19216245.1; dated Jun. 2, 2020; 7 Pages.

*Primary Examiner* — Elim Ortiz

(74) *Attorney, Agent, or Firm* — CANTOR COLBURN LLP

(57) ABSTRACT

A hybrid energy storage system for an elevator car includes a converter disposed on the elevator car and receives power from a power source and provides a first DC voltage to a first DC bus and a second DC voltage to a second DC bus, a first energy storage device connected to the converter receives the first DC voltage on the first DC bus, and a second energy storage device connected to the converter receives the second DC voltage on the second DC bus. The system also includes a first load connected to the first DC bus and a second DC bus, and a second load connected to the second DC bus. Power is provided from the first energy storage device to the first load under a first selected condition and power is supplied from the second energy storage device to the first load under second selected condition.

18 Claims, 5 Drawing Sheets

(51) Int. Cl.
*B66B 11/02* (2006.01)
*H02J 7/34* (2006.01)
*H02J 50/12* (2016.01)

(58) Field of Classification Search
CPC .... B66B 3/00; B66B 5/00; B66B 7/00; B60L 2210/10; H02M 7/064; H02M 3/156; H02M 3/1582; H02M 3/139; H02M 3/02; H02M 3/04; H02J 50/05; H02J 50/10; H02J 50/12; H02J 50/40; H02J 50/50; H02J 50/90
USPC .... 307/11, 15, 8, 19, 21, 22, 26, 27, 58, 65, 307/66, 67, 68, 71, 18, 23, 29, 34, 43, 48, 307/20, 25, 37, 38, 57, 59, 60, 61, 62, 74, 307/77, 9.1, 10.1; 187/250, 251, 348, 187/380, 386, 411; 320/126, 128, 131, 320/132, 16, 158, 166, 167
See application file for complete search history.

(56) References Cited

U.S. PATENT DOCUMENTS

| | | | |
|---|---|---|---|
| 7,331,426 B2 | 2/2008 | Jahkonen | |
| 7,681,694 B2 | 3/2010 | Aulanko et al. | |
| 8,096,387 B2 | 1/2012 | Kattainen et al. | |
| 8,230,978 B2 | 7/2012 | Agirman et al. | |
| 8,590,672 B2 | 11/2013 | Oggianu et al. | |
| 8,689,944 B2 | 4/2014 | Manfredi et al. | |
| 9,263,721 B1* | 2/2016 | Dhar | H01M 50/112 |
| 9,584,047 B2 | 2/2017 | Frohman et al. | |
| 9,834,406 B2 | 12/2017 | Mezzadri et al. | |
| 2010/0156369 A1* | 6/2010 | Kularatna | G05F 1/46 |
| | | | 323/282 |
| 2010/0187045 A1 | 7/2010 | Ishikawa | |
| 2011/0139547 A1* | 6/2011 | Veronesi | B66B 1/302 |
| | | | 187/247 |
| 2014/0008155 A1 | 1/2014 | Rossignol | |
| 2014/0084817 A1* | 3/2014 | Bhavaraju | B60L 50/40 |
| | | | 307/46 |
| 2017/0063233 A1 | 3/2017 | Lehn et al. | |
| 2018/0229968 A1 | 8/2018 | Cheng et al. | |

FOREIGN PATENT DOCUMENTS

| | | | |
|---|---|---|---|
| CN | 104692200 B | 6/2015 | |
| CN | 107645171 A | 1/2018 | |
| IN | 04310DE2015 | 10/2016 | |
| JP | 2009286635 A | * 12/2009 | |
| JP | 2009286635 A | 12/2009 | |
| KR | 101212956 B1 | 5/2011 | |
| WO | 2018138403 A1 | 8/2018 | |

* cited by examiner

HYBRID ENERGY STORAGE SYSTEM ARCHITECTURES

CROSS-REFERENCE TO RELATED APPLICATIONS

This application claims the benefit of U.S. provisional patent application Ser. No. 62/779,731, filed Dec. 14, 2018, the entire contents of which are incorporated herein by reference.

BACKGROUND

The present disclosure relates to electromechanical propulsion systems, and more particularly to electrically autonomous elevator systems having autonomous elevator car power systems without a travelling cable.

A typical elevator system includes a car and a counterweight disposed within a hoistway, a plurality of tension ropes that interconnect the car and counterweight, and a drive unit having a drive sheave engaged with the tension ropes to drive the car and the counterweight. The ropes, and thereby the car and counterweight, are driven by rotating the drive sheave. Elevator cars typically need power for ventilation, lighting systems, operation of doors and brakes, control units, communication units and to recharge batteries installed, for example, on an elevator car controller. Moreover, elevator cars may require back-up systems in case of a power failure. Existing systems use moving cables or current collectors/sliders to connect a moving elevator car with power lines distributed along the elevator hoistway. These systems while simple and functional also require maintenance inspection and add cost to the elevator system.

BRIEF SUMMARY

According to an embodiment, described herein is a hybrid energy storage system for an elevator car includes a converter disposed on the elevator car and receives power from a power source and provides a first DC voltage to a first DC bus and a second DC voltage to a second DC bus, a first energy storage device connected to the converter receives the first DC voltage on the first DC bus, and a second energy storage device connected to the converter receives the second DC voltage on the second DC bus. The system also includes a first load connected to the first DC bus and a second DC bus, and a second load connected to the second DC bus. Power is provided from the first energy storage device to the first load under a first selected condition and power is supplied from the second energy storage device to the first load under second selected condition.

Also described herein in an embodiment is a hybrid energy storage system for an elevator car, the system comprising: a converter disposed on the elevator car and operably connected to receive power from a power source and provide at least a first DC voltage to a first DC bus and a second DC voltage to a second DC bus, a first energy storage device operably connected to the converter and configured to receive the first DC voltage on the first DC bus from the converter, and a second energy storage device operably connected to the converter and configured to receive the second DC voltage on the second DC bus from the converter. The system also includes a first load of a plurality of loads operably connected to the first DC bus and a second DC bus. Power is provided from at least one of the first energy storage device and a second energy storage device to the first load under a first selected condition.

In addition to one or more of the features described above, or as an alternative, further embodiments of the method may include that power is supplied from the second energy storage device to the first load under second selected condition.

In addition to one or more of the features described above, or as an alternative, further embodiments of the method may include that the second selected condition, is based at least in part on at least one of an elevator car operating characteristic, an elevator system operating characteristic, a rate of current supplied to the first load a state of charge of the first energy storage device, and a state of charge of a second energy storage device.

In addition to one or more of the features described above, or as an alternative, further embodiments of the method may include a second load of a plurality of loads operably connected to the first DC bus, wherein power is provided from the first energy storage device to the second load under a third selected condition.

In addition to one or more of the features described above, or as an alternative, further embodiments of the method may include that the third selected condition, is based at least in part on at least one of an elevator car operating characteristic, an elevator system operating characteristic, a rate of current supplied to the first load a state of charge of the first energy storage device, and a state of charge of a second energy storage device.

In addition to one or more of the features described above, or as an alternative, further embodiments of the method may include that the first selected condition, is based at least in part on at least one of an elevator car operating characteristic, an elevator system operating characteristic, a rate of current supplied to the first load a state of charge of the first energy storage device, and a state of charge of a second energy storage device.

In addition to one or more of the features described above, or as an alternative, further embodiments of the method may include that the elevator car operating characteristic includes at least one of a dispatching requirement for the elevator car and a dispatching history for the elevator car.

In addition to one or more of the features described above, or as an alternative, further embodiments of the method may include that the first energy storage device is a battery, the battery exhibiting a storage capacity of at least about 30 WHr.

In addition to one or more of the features described above, or as an alternative, further embodiments of the method may include that the battery is at least one of lead-acid, NiCd, NiMH, or Li-Ion.

In addition to one or more of the features described above, or as an alternative, further embodiments of the method may include that the second energy storage device is a super capacitor, the super capacitor exhibiting a capacitance of at least about 0.5 Farads.

Also described herein in another embodiment is a method of providing power to a plurality of loads for an elevator car with a hybrid energy storage, the method including operably connecting a converter disposed on the elevator car to receive power from a power source and providing at least a first DC voltage to a first DC bus and a second DC voltage to a second DC bus, operably connecting a first energy storage device to the converter and receiving the first DC voltage on the first DC bus from the converter, operably connecting a second energy storage device to the converter and receiving the second DC voltage on the second DC bus from the converter, operably connecting a first load of the plurality of loads to the first DC bus and a second DC bus, and providing power from at least one of the first energy storage device and the second energy storage device to the first load under a first selected condition.

In addition to one or more of the features described above, or as an alternative, further embodiments of the method may include supplying power from the second energy storage device to the first load under second selected condition.

In addition to one or more of the features described above, or as an alternative, further embodiments of the method may include that the second selected condition, is based at least in part on at least one of an elevator car operating characteristic, an elevator system operating characteristic, a rate of current supplied to the first load a state of charge of the first energy storage device, and a state of charge of a second energy storage device.

In addition to one or more of the features described above, or as an alternative, further embodiments of the method may include operably connecting a second load of the plurality of loads to the first DC bus, wherein power is provided from the first energy storage device to the second load under a third selected condition.

In addition to one or more of the features described above, or as an alternative, further embodiments of the method may include that the third selected condition, is based at least in part on at least one of an elevator car operating characteristic, an elevator system operating characteristic, a rate of current supplied to the first load a state of charge of the first energy storage device, and a state of charge of a second energy storage device.

In addition to one or more of the features described above, or as an alternative, further embodiments of the method may include that the third selected condition, is based at least in part on at least one of an elevator car operating characteristic, an elevator system operating characteristic, a rate of current supplied to the first load a state of charge of the first energy storage device, and a state of charge of a second energy storage device.

In addition to one or more of the features described above, or as an alternative, further embodiments of the method may include that elevator car operating characteristic includes at least one of a dispatching requirement for the elevator car and a dispatching history for the elevator car.

In addition to one or more of the features described above, or as an alternative, further embodiments of the method may include that the first energy storage device is a battery, the battery exhibiting a storage capacity of at least 30 WHr.

In addition to one or more of the features described above, or as an alternative, further embodiments of the method may include that the battery is at least one of lead-acid, NiCd, NiMH, or Li-Ion.

In addition to one or more of the features described above, or as an alternative, further embodiments of the method may include that the second energy storage device is a super capacitor, the super capacitor exhibiting a capacitance of at least 0.5 Farads.

Also described herein in yet another embodiment is a hybrid energy storage system architecture for an elevator car, the system including a first DC bus configured to receive power from a power source and provide at least a first DC voltage a first energy storage device disposed on the elevator car operably connected to first DC bus, the first energy storage device operable to receive energy from and supply energy to the first DC bus at the first DC voltage, and a bidirectional DC/DC converter disposed on the elevator car and having an input operably connected to the first DC bus, the bidirectional DC/DC converter having an output operable to supply a low voltage DC bus at a second DC voltage.

The system also includes a first energy storage device disposed on the elevator car operably connected to the output of the bidirectional converter and the low voltage DC bus; a first load of a plurality of loads operably connected to the output of the bidirectional converter and the low voltage DC bus. In the system, power is provided from the first energy storage device to the first DC bus under a first selected condition.

In addition to one or more of the features described above, or as an alternative, further embodiments of the method may include a second load of a plurality of loads operably connected to the first DC, wherein the first DC bus is a high voltage bus.

In addition to one or more of the features described above, or as an alternative, further embodiments of the method may include connecting a second energy storage device disposed on the elevator car to first DC bus, the second energy storage device receiving energy from and supplying energy to the first DC bus at the first DC voltage under a second selected condition.

In addition to one or more of the features described above, or as an alternative, further embodiments of the method may include that the first selected condition is based at least in part on at least one of an elevator car operating characteristic, an elevator system operating characteristic, a rate of current supplied to the first load a state of charge of the first energy storage device, and a state of charge of a second energy storage device.

In addition to one or more of the features described above, or as an alternative, further embodiments of the method may include a DC/DC converter disposed on the elevator car and having an input operably connected to the first DC bus, the first DC/DC converter having an output operable to supply a high voltage DC bus, wherein a second load of a plurality of loads is operably connected to the output of the DC/DC converter and the high voltage DC bus.

In addition to one or more of the features described above, or as an alternative, further embodiments of the method may include that the first energy storage device is a battery, the battery exhibiting a storage capacity of at least 30 WHr.

In addition to one or more of the features described above, or as an alternative, further embodiments of the method may include that the battery is at least one of lead-acid, Ni-Cd, NiMH, or Li-Ion.

In addition to one or more of the features described above, or as an alternative, further embodiments of the method may include that the second energy storage device is a super capacitor, the super capacitor exhibiting a capacitance of at least 0.5 Farads.

In addition to one or more of the features described above, or as an alternative, further embodiments of the method may include that the first selected condition is based at least in part on at least one of an elevator car operating characteristic, an elevator system operating characteristic, a rate of current supplied to the first load a state of charge of the first energy storage device, and a state of charge of a second energy storage device.

In addition to one or more of the features described above, or as an alternative, further embodiments of the method may include that elevator car operating characteristic includes at least one of a dispatching requirement for the elevator car and a dispatching history for the elevator car.

Also described herein in yet another embodiment is a method of providing power to a plurality of loads for an elevator car with a hybrid energy storage. The method includes configuring a first DC bus to receive power from a power source and provide at least a first DC voltage, operably connecting an input of a bidirectional DC/DC converter disposed on the elevator car to the first DC bus, the bidirectional DC/DC converter having an output operable to supply a low voltage DC bus at a second DC voltage, a first energy storage device disposed on the elevator car operably connected to the output of the bidirectional converter and the low voltage DC bus, operably connecting a first load of a plurality of loads to the output of the bidirectional converter and the low voltage DC bus and providing power from the second energy storage device to the first DC bus under a first selected condition.

In addition to one or more of the features described above, or as an alternative, further embodiments of the method may include operably connecting a second load of the plurality of loads to the high voltage DC bus.

In addition to one or more of the features described above, or as an alternative, further embodiments of the method may include operably connecting a second energy storage device disposed on the elevator car to first DC bus, the second energy storage device receiving energy from and supplying energy to the first DC bus at the first DC voltage.

In addition to one or more of the features described above, or as an alternative, further embodiments of the method may include that the first selected condition is based at least in part on at least one of an elevator car operating characteristic, an elevator system operating characteristic, a rate of current supplied to the first load a state of charge of the first energy storage device, and a state of charge of a second energy storage device.

In addition to one or more of the features described above, or as an alternative, further embodiments of the method may include operably connecting an input of a DC/DC converter disposed on the elevator car to the first DC bus, the first DC/DC converter having an output operable to supply a high voltage DC bus, wherein a second load of a plurality of loads is operably connected to the output of the DC/DC converter and the high voltage DC bus.

In addition to one or more of the features described above, or as an alternative, further embodiments of the method may include that the first energy storage device is a battery, the battery exhibiting a storage capacity of at least 30 WHr.

In addition to one or more of the features described above, or as an alternative, further embodiments of the method may include that the battery is at least one of lead-acid, NiCd, NiMH, or Li-Ion.

In addition to one or more of the features described above, or as an alternative, further embodiments of the method may include that the second energy storage device is a super capacitor, the super capacitor exhibiting a capacitance of at least 0.5 Farads.

In addition to one or more of the features described above, or as an alternative, further embodiments of the method may include that the first selected condition is based at least in part on at least one of an elevator car operating characteristic, an elevator system operating characteristic, a rate of current supplied to the first load a state of charge of the first energy storage device, and a state of charge of a second energy storage device.

In addition to one or more of the features described above, or as an alternative, further embodiments of the method may include that elevator car operating characteristic includes at least one of a dispatching requirement for the elevator car and a dispatching history for the elevator car.

Technical effects of embodiments of the present disclosure include an elevator system with autonomous elevator cars with an integral energy storage system and power control system as well as a power transfer system. The elevator system is operable to provide service independent of the power transfer system for a selected duration. Technical effects also include a power connection system and communication system for powering and communications with elevator car subsystems and to fixed parts of the systems.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The present disclosure is illustrated by way of example and not limited to the accompanying figures in which like reference numerals indicate similar elements.

DETAILED DESCRIPTION

Figure 1:
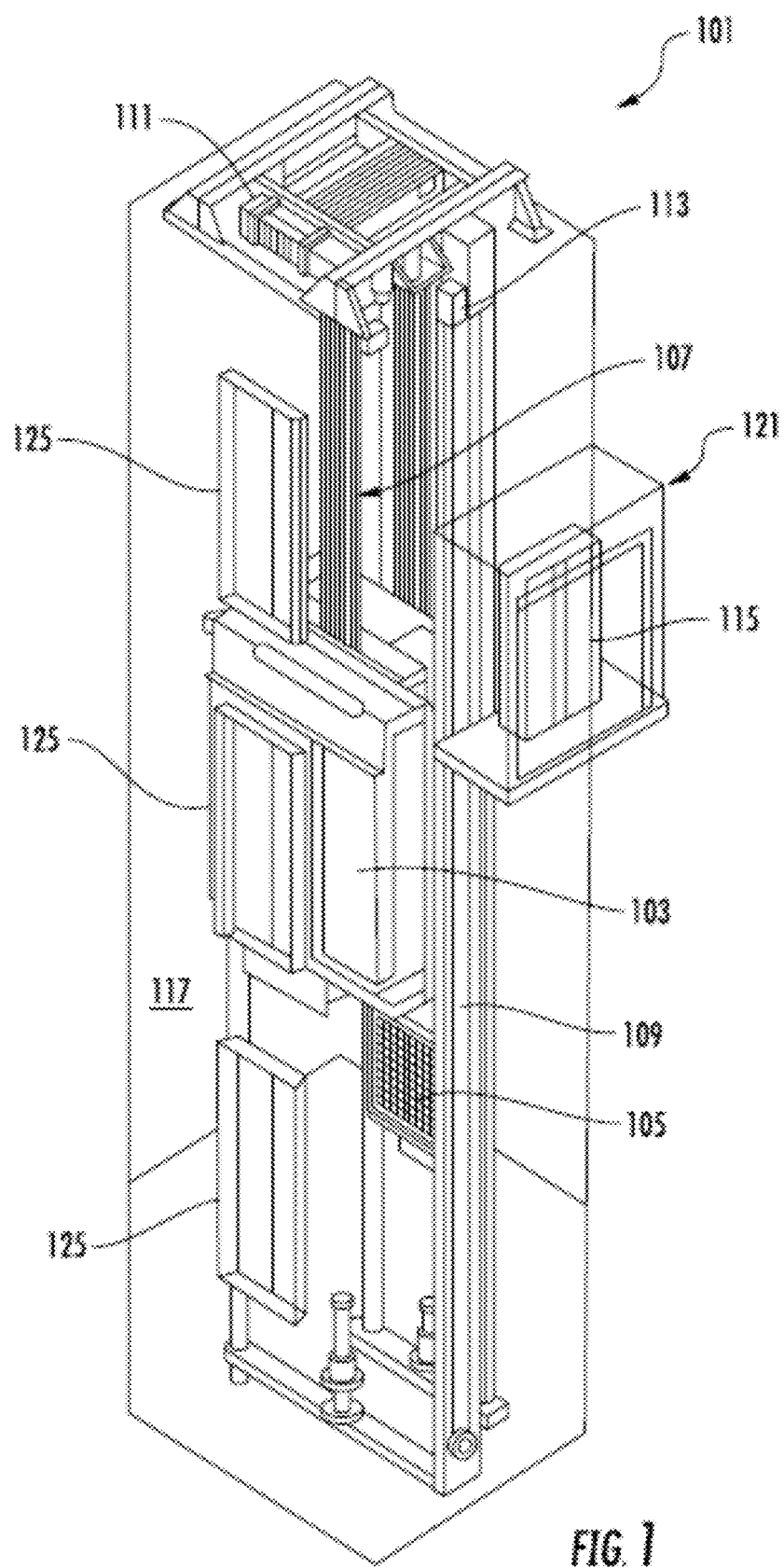
FIG. 1 is a schematic illustration of an elevator system that may employ various embodiments of the present disclosure.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended. The following description is merely illustrative in nature and is not intended to limit the present disclosure, its application or uses. It should be understood that throughout the drawings, corresponding reference numerals indicate like or corresponding parts and features. As used herein, the term controller refers to processing circuitry that may include an application specific integrated circuit (ASIC), an electronic circuit, an electronic processor (shared, dedicated, or group) and memory that executes one or more software or firmware programs, a combinational logic circuit, and/or other suitable interfaces and components that provide the described functionality.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection".

As shown and described herein, various features of the disclosure will be presented. Various embodiments may have the same or similar features and thus the same or similar features may be labeled with the same reference numeral, but preceded by a different first number indicating the figure to which the feature is shown. Thus, for example, element "a" that is shown in FIG. X may be labeled "Xa" and a similar feature in FIG. Z may be labeled "Za." Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

FIG. 1 is a perspective view of an elevator system 101 including an elevator car 103, a counterweight 105, a tension member 107, a guide rail 109, a machine 111, a position reference system 113, and a controller 115. The elevator car 103 and counterweight 105 are connected to each other by the tension member 107. The tension member 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator shaft 117 and along the guide rail 109.

The tension member 107 engages the machine 111, which is part of an overhead structure of the elevator system 101. The machine 111 is configured to control movement between the elevator car 103 and the counterweight 105. The position reference system 113 may be mounted on a fixed part at the top of the elevator shaft 117, such as on a support or guide rail 109, and may be configured to provide position signals related to a position of the elevator car 103 within the elevator shaft 117. In other embodiments, the position reference system 113 may be directly mounted to a moving component of the machine 111, or may be located in other positions and/or configurations as known in the art. The position reference system 113 can be any device or mechanism for monitoring a position of an elevator car 103 and/or counter weight 105, as known in the art. For example, without limitation, the position reference system 113 can be an encoder, sensor, or other system and can include velocity sensing, absolute position sensing, etc., as will be appreciated by those of skill in the art.

The controller 115 is located, as shown, in a controller room 121 of the elevator shaft 117 and is configured to control the operation of the elevator system 101, and particularly the elevator car 103. For example, the controller 115 may provide drive signals to the machine 111 to control the acceleration, deceleration, leveling, stopping, etc. of the elevator car 103. The controller 115 may also be configured to receive position signals from the position reference system 113 or any other desired position reference device. When moving up or down within the elevator shaft 117 along guide rail 109, the elevator car 103 may stop at one or more landings 125 as controlled by the controller 115. Although shown in a controller room 121, those of skill in the art will appreciate that the controller 115 can be located and/or configured in other locations or positions within the elevator system 101. In one embodiment, the controller 115 may be located remotely or in the cloud.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor. The machine 111 may include a traction sheave that imparts force to tension member 107 to move the elevator car 103 within elevator shaft 117.

Although shown and described with a roping system including tension member 107, elevator systems that employ other methods and mechanisms of moving an elevator car 103 within an elevator shaft 117 may employ embodiments of the present disclosure. For example, embodiments may be employed in ropeless elevator systems using a linear motor to impart motion to an elevator car. Embodiments may also be employed in ropeless elevator systems using a hydraulic lift to impart motion to an elevator car 103. FIG. 1 is merely a non-limiting example presented for illustrative and explanatory purposes.

Figure 2:
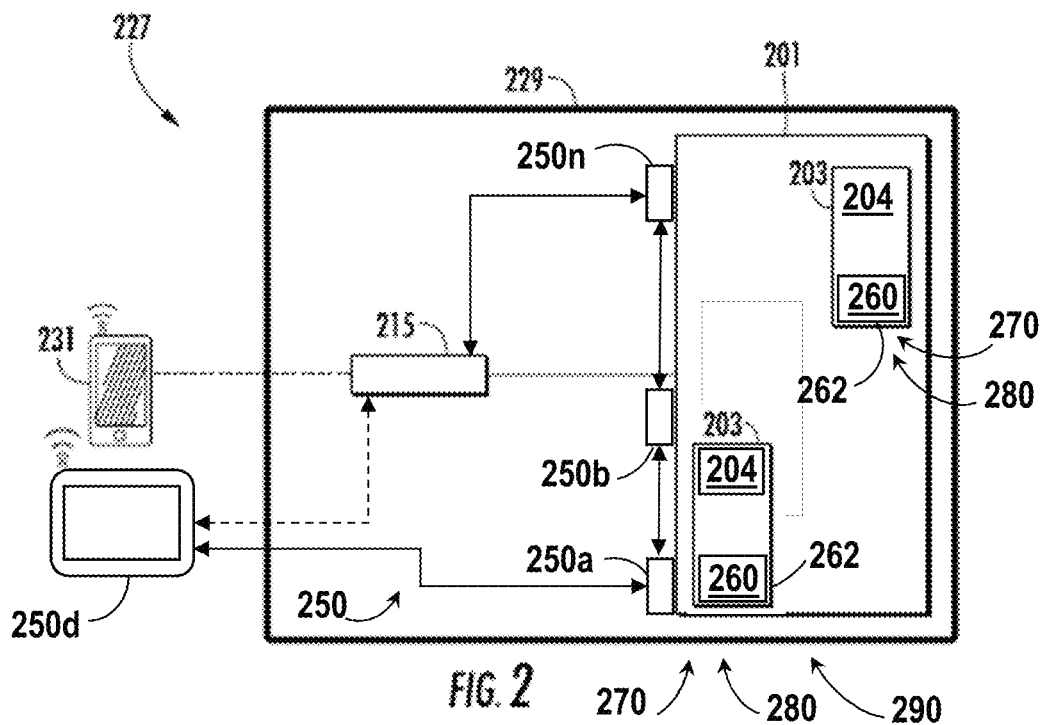
FIG. 2 is a schematic illustration of a system in accordance with an embodiment of the present disclosure.

Turning now to FIG. 2, a schematic illustration of a building system 227 in an example embodiment of the present disclosure is shown. The building system 227 includes an elevator system 201 installed within a structure 229 (e.g., a building). In some embodiments, the structure 229 may be an office building or a collection of office buildings that may or may not be physically located near each other. The structure 229 may include any number of floors that are accessible by the elevator system 201 and thus the structure 229 can include any number of landings (e.g., as shown in FIG. 1). Persons entering the structure 229 may enter at a lobby floor and may travel to a destination floor via one or more elevator cars 203 that are part of the elevator system 201.

The elevator system 201 may include one or more computing devices, such as an elevator controller 215 and a car controller 204. The elevator controller 215 may be configured to control various operations for one or more elevator cars 203 associated with the elevator system 201. The functions of the elevator controller 215 may also be partitioned. For example, in one configuration the elevator controller 215 may be configured to, and be responsible for, controlling system operation and/or dispatching operations for one or more elevator cars e.g., 203 associated with the elevator system 201 as described herein. While another controller, denoted here 204 may be configured to, and responsible for, controlling operations associated with individual elevator cars 203. It is understood that the elevator system 201 may utilize more than one elevator controller 215, and that each elevator controller 215 may control a group of elevators cars 203. In addition, an individual car controller 204 may be employed to address controlling functions for each of the individual elevator cars 203 respectively. Although two elevator cars 203 are shown in FIG. 2, those of skill in the art will appreciate that any number of elevators cars 203 may be employed in the elevator and building systems 229 that employ embodiments of the present disclosure. The elevator cars 203 can be located in the same hoistway or in different hoistways so as to allow coordination amongst elevator cars 203 in different elevator banks serving different floors (e.g., sky lobbies, etc.). It is understood that the elevator system 201 may include various features as described above with reference to FIG. 1 and may also include other non-depicted elements and/or features as known in the art (e.g., drive, counterweight, safeties, etc.). Moreover, the elevators and cars 203 may be employed in any configuration with all elevators serving all floors of the building, some elevators only serving certain floors, a first group of elevator serving lower floors of a building and a sky lobby and a second group of elevators serving the sky lobby and upper floors of the building, etc.

The elevator system 201 also includes an elevator car power system 260. The elevator car power system 260 may include, but are not limited to a energy storage system shown generally as 270 and a power management system shown generally as 280 configured to control power to various loads shown generally as 290 on the elevator car 203 including, but not limited to lighting, ventilation, air conditioning, lighting system, car controls, indicators displays information panels, elevator door control system, brakes, safeties, and the like as may be employed to provide for the needs of the passengers in the elevator car 203. The elevator car power system 260 loads 290 may be alternating current (AC) loads, such as fans of the ventilation unit and others, utilizing a traditional power frequency such as, for example, about 60 Hz. Alternatively, or in addition thereto, the subsystems may include direct current (DC) loads 290, such as a display unit, brakes and the like.

The energy storage system 270 may include various energy storage devices including but not limited to batteries, super capacitors, flow batteries and the like sufficient to provide for the energy storage requirements for controlling and operating the elevator car 203 autonomously (i.e., without a travelling cable) and without a power and communication connection for a selected duration. The power management system 280 monitors and controls the charging and discharging of the energy storage system 270 as needed to ensure the operation of the elevator car. In an embodiment, the elevator car power system 260 includes a car power controller 262 that is configured to communicate with other on the board elevator controller, e.g., car controller 204 as well as other components and controllers in the elevator system 201. Further detail regarding the detail, operation, and function of the elevator car power system 260 is provided herein.

The elevator system 201 also includes one or more fixtures shown generally as 250 and more particularly as 250a, 250b, . . . 250n each distributed at a lobby in the building and one or more floors. The fixtures 250 include, but are not limited to an elevator call button, hall call buttons, and the like and may further include information panels, lanterns, direction arrows and the like as may be employed to provide information about the elevator cars 203 and their destinations. The fixtures may also include a control panel kiosk 250d where a passenger may enter a destination request. The fixtures 250 are configured to communicate with the elevator controller 215 as may be required to control dispatching operations for one or more elevator cars 203 associated with the elevator system 201.

Figure 4:
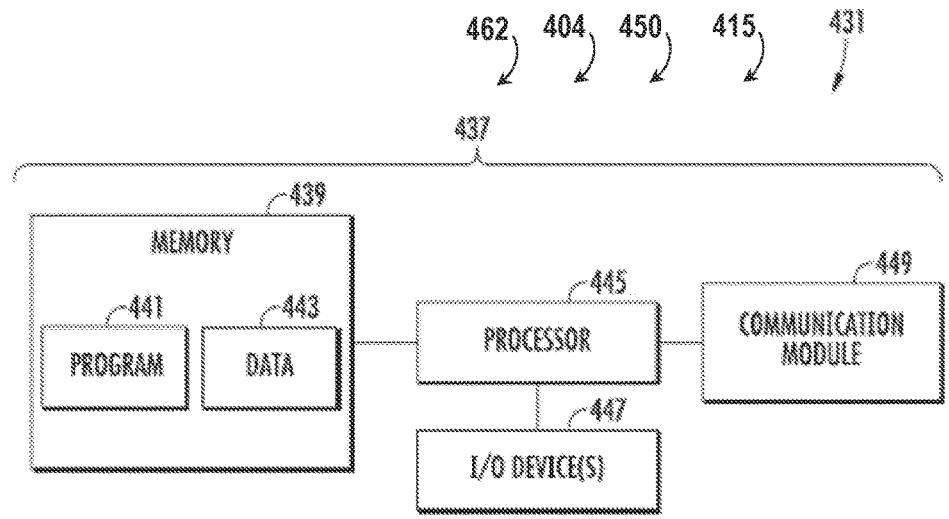
FIG. 4 is a schematic illustration of a computing system of a user device and/or controller in accordance with an embodiment of the present disclosure.

Also shown in FIG. 2 is a user device 231, such as a mobile device (e.g., smart phone, smart watch, wearable technology, laptop, tablet, etc.). The user device 231 may include a mobile and/or personal device that is typically carried by a person, such as a phone, PDA, etc. The user device 231 may include a processor, memory, and communication module(s), as shown in FIG. 4. As described below, the processor can be any type or combination of computer processors, such as a microprocessor, microcontroller, digital signal processor, application specific integrated circuit, programmable logic device, and/or field programmable gate array. The memory can be a non-transitory computer readable storage medium tangibly embodied in the user device 231 including executable instructions stored therein, for instance, as firmware. The communication module may implement one or more communication protocols as described in further detail herein, and may include features to enable wireless communication with external and/or remote devices separate from the user device 231. The user device 231 may further include a user interface (e.g., a display screen, a microphone, speakers, input elements such as a keyboard or touch screen, etc.) as known in the art.

The elevator controller 215, power system controller 262, and or car controller 204 may also include a processor, memory, and a communication module also as shown in FIG. 4. Similar to the user device 231, the processor memory, and communication module may be implemented as described herein, but as part of the elevator system 201. Furthermore the fixtures, 250 including the kiosk 250 may also include a processor, memory, and a communication module also as shown in FIG. 4. Similar to the user device 231, elevator controller 215, power system controller 262, car controller 204, the processor memory, and communication module may be implemented as described herein, but as part of the elevator system 201.

Figure 3:
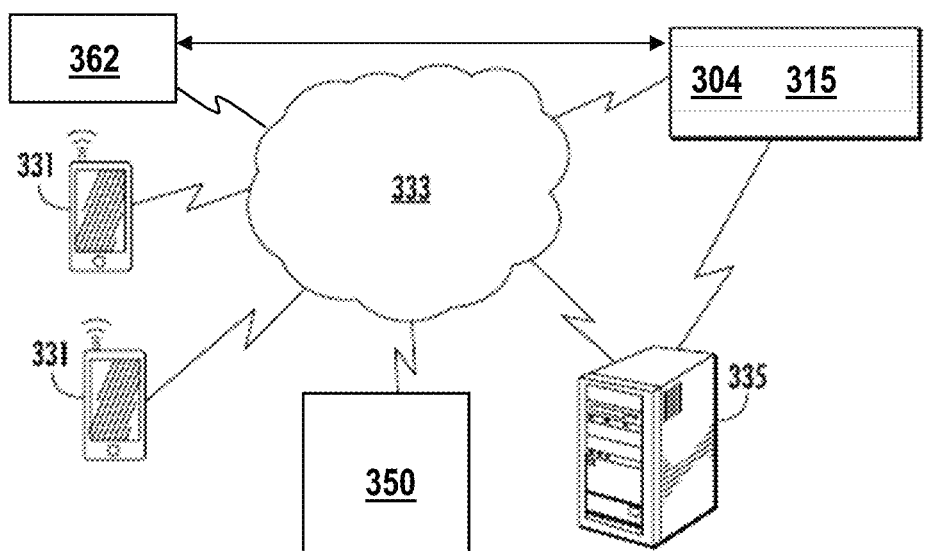
FIG. 3 is a schematic illustration of a network system in accordance with an embodiment of the present disclosure.

FIG. 3 depicts an exemplary communication system as may be employed in the elevator system 201 in accordance with an embodiment (with each of the reference numerals incremented by 100). User device 331 (e.g., 231), elevator controller(s) 315 (e.g., 215), car controller 304 (e.g., 204) and/or car power system controller 362 (e.g., 262) can communicate with one another as shown. For example, one or more user device(s) 331 and the elevator controller 315 and/or car controller 304 may communicate with one another when proximate to one another (e.g., within a threshold distance). The user device 331 and the elevator controller 315 may communicate over a network 333, that may be wired or wireless. Wired communication can be conventional including standard hard wiring or Ethernet. In an embodiment, the fixtures are connected with the elevator controller employing a daisy chain connected Ethernet interface as described herein. Wireless communication networks can include, but are not limited to, Wi-Fi®, short-range radio (e.g., Bluetooth®), near-field infrared, cellular network, etc. In some embodiments, the car controller 304 and/or elevator controller 315 may include, or be associated with (e.g., communicatively coupled to) one or more networked building elements 335, such as computers, kiosks, beacons, hall call fixtures 350, lanterns, bridges, routers, network nodes, etc. The networked building element 335 may also communicate directly or indirectly with the user devices 331 using one or more communication protocols or standards (e.g., through the network 333).

For example, the networked building element 335 may communicate with the user devices 331 using near-field communications (NFC) (e.g., network 333) and thus enable communication between the user devices 331 the car controller 304, car power system controller 362, and the elevator controller 315. In some embodiments, the elevator controller 315, the car controller 304, or car power system controller 362 may establish communication with one or more user devices 331 that are outside of the structure/building (e.g., 229). Such connection may be established with various technologies including GPS, triangulation, or signal strength detection, by way of non-limiting example. Such technologies that allow communication can provide users and the system(s) described herein more time to perform the described functions. In example embodiments, the user devices 331 communicate with the elevator controller 315, car power system controller 362, and/or the car controller 304 over multiple independent wired and/or wireless networks. Embodiments are intended to cover a wide variety of types of communication between the user devices 331, the car controller and/or the elevator controller 315, and embodiments are not limited to the examples provided in this disclosure.

The network 333 may be any type of known communication network including, but not limited to, a wide area network (WAN), a local area network (LAN), a global network (e.g. Internet), a virtual private network (VPN), a cloud network, and an intranet. The network 333 may be implemented using a wireless network or any kind of physical network implementation known in the art. The user devices 331 and/or the networked building element 335 may be coupled to the elevator controller 315 and/or the car controller 304 through multiple networks 333 (e.g., cellular and Internet) so that not all user devices 331 and/or the networked building element 335 are coupled to the elevator controller 315 through the same network 333. One or more of the user devices 331, the car controller, car power system controller 362, and/or the elevator controller 315 may be connected to the network 333 in a wireless fashion. In one non-limiting embodiment, the network 333 is the Internet and one or more of the user devices 331 execute a user interface application (e.g. a web browser) to contact the elevator controller 315 through the network 333.

As noted, the elevator controller 315, the car controller 304, and/or car power system controller 362 may be associated with an elevator system (e.g., elevator systems 101, 201). The elevator controller 315 may be used to process or fulfill the requests for elevator service that are submitted from one or more user devices 331. The requests for elevator service may be received through the network 333 from the one or more user devices 331 and/or the networked building elements 335, which may be mobile devices, including, but not limited to phones, laptops, tablets, smartwatches, etc. One or more of the user devices 331 may be associated with (e.g., owned by) a particular user. The user may use his/her user device(s) 331 to request elevator service. Likewise, the car controller 304, and/or car power system controller 362 may interface with the elevator controller 315 to ensure that a user's requests are carried out, functions are provided in the elevator car 303, and the like. In an embodiment, the car controller 304, and/or car power system controller 362 may interface directly with one or more user devices 331 to facilitate communications with the user particularly when in a respective elevator car. For example, the car controller may provide status information, news, communications, time of arrival and the like to a user device 331.

Referring now to FIG. 4, schematic block diagram illustrations of example computing systems 437 as may be employed for a user device 431, an elevator controller 415, car controller 404, and/or a kiosk or fixture 450, and/or car power system controller 462 respectively, are shown. The computing system 437 may be representative of computing elements or components of user devices e.g., 331, 431, networked building elements 335, mobile devices controller, fixtures, etc. as employed in embodiments of the present disclosure. The computing system 437 can be configured to operate the user device 431, elevator controller 415, car controller 404, car power system controller 462, fixture, etc. including, but not limited to, operating and controlling a touch-screen display to display various output and receive various input from a user's interaction with the touch-screen display. The computing system 437 may be connected to various elements and components within a building that are associated with operation of an elevator system 101.

As shown, the computing system 437 includes a memory 439, which may store executable instructions and/or data. The executable instructions may be stored or organized in any manner and at any level of abstraction, such as in connection with one or more applications, apps, programs, processes, routines, procedures, methods, etc. As an example, at least a portion of the instructions are shown in FIG. 4 as being associated with a program 441. The memory 439 can include RAM and/or ROM and can store the program 441 thereon, wherein the program 441 may also include an operating system and/or applications to be used on the user device 431, elevator controller 415, car controller 404, car power system controller 462, fixtures 450 and the like. Further, the memory 439 may store data 443. The data 443 may include profile or registration data (e.g., in a user device 331, 431), a device identifier, or any other type(s) of data, product configuration and the like. The executable instructions stored in the memory 439 may be executed by one or more processors, such as a processor 445, which may be a mobile processor in the user device 431 mobile application or a standard processor as my be employed in the elevator controller 415, car controller 404 or a fixture 450. The processor 445 may be operative on the data 443 and/or configured to execute the program 441. In some embodiments, the executable instructions can be performed using a combination of the processor 445 and remote resources (e.g., data and/or programs stored in the cloud (e.g., remote servers).

The processor 445 may be coupled to one or more input/output (I/O) devices 447. In some embodiments, the I/O device(s) 447 may include one or more of a physical keyboard or keypad, a touchscreen or touch panel, a display screen, a microphone, a speaker, a mouse, one or more push button, e.g., parts or features of a telephone or mobile device (e.g., a smartphone), or panel buttons. For example, the I/O device(s) 447 may be configured to provide an interface to allow a user to interact with the user device 431, car controller 404, elevator controller 415, or fixture 450. In some embodiments, the I/O device(s) 447 may support a graphical user interface (GUI) and/or voice-to-text capabilities for the user device 431.

The components of the computing system 437 may be operably and/or communicably connected by one or more buses. The computing system 437 may further include other features or components as known in the art. For example, the computing system 437 may include one or more communication modules 449, e.g., transceivers and/or devices configured to receive information or data from sources external to the computing system 437a. In one embodiment, the communication modules 449 may include Ethernet interfaces configured for implementing the daisy chain network as described herein. In another non-limiting embodiment, the communication modules 449 of the user device 431, car controller 404, elevator controller 415, car power system controller 462, or fixture 450 can include a near-field communication chip (e.g., Bluetooth®, Wi-Fi, etc.) and a cellular data chip, as known in the art. In some embodiments, the computing system 437 may be configured to receive information over a network (wired in some examples or wireless in others), such as network 333 shown in FIG. 3. The information received over the network may be stored in the memory 43a (e.g., as data 443) and/or may be processed and/or employed by one or more programs or applications (e.g., program 441).

The computing systems 437 may be used to execute or perform embodiments and/or processes described herein, such as within and/or on the elevator controller 415, car controller 404, car power system controller 462, and fixtures 450 to enable a user to make service requests to an elevator system. To make such service requests, the computing system 437 of fixture 450 may communicate with the computing system 437 of the elevator controller 415, where the communication employs the daisy chain Ethernet network e.g., 333 as described herein.

Figure 5:
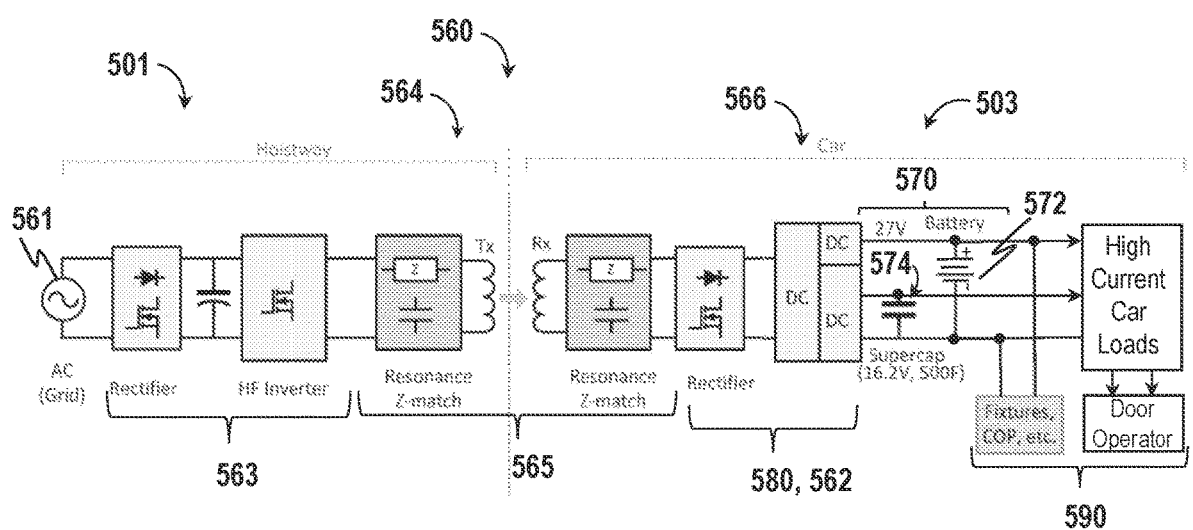
FIG. 5 is a simplified block diagram of an architecture for a hybrid power system on an elevator car in accordance with an embodiment.

Turning now to FIG. 5, a simplified schematic illustration of an elevator system 501 with elevator car 503 and elevator car power system 560 in accordance with an embodiment is depicted. The elevator car power system 560 includes a fixed or stationary portion shown generally as 564, configured and mounted in the hoistway/elevator shaft (e.g., 117 FIG. 1) as needed and a moving portion, shown generally as 566, mounted and installed with the elevator car 503 and/or the counterweight (e.g., 105 FIG. 1). In an embodiment the stationary portion 564 receives power from the grid power supply 561 associated with the building (e.g., 229) a converter 563 may be employed to convert the power (typically three-phase alternating current (AC) to a frequency and voltage convenient for transmission to the moving portion 566 of the elevator car power system 560. The transmission of power to the moving portion 566 of the elevator car power system 560 may be wired or wireless. In one embodiment, mating electrical contacts (not shown) may be employed to conductively transfer power from the stationary portion 564 to the moving portion 566. In another embodiment, a wireless power transfer system shown generally as 565, having impedance and resonance matching and coupling transformers is employed to transfer energy from the stationary portion 564 to the moving portion 566 of the elevator car power system 560.

Continuing with FIG. 5, the elevator car power system 560 may include, but are not limited to an energy storage system shown generally as 570 and a power management system shown generally as 580 configured to control power to various loads on the elevator car 503. The energy storage system 570 may include various energy storage devices including, but not limited to batteries 572 operably coupled with one or more super capacitors 574. The energy storage system 570 may include other storage devices including a variety of types of batteries as well as flow batteries and the like sufficient to provide for the energy storage requirements for controlling and operating the elevator car 503. The batteries may include one or more types of battery technologies including, but not limited to lead acid, NiCd, NiMH, Li-ion, and the like. In an embodiment, Li-Ion batteries 572 are employed to achieve the highest energy density, particularly for longer duration loads. In an embodiment for the purposes of illustration it is expected that the energy storage device, and in particular the batter would be on the order of at least about 30 WHr. However, larger or smaller capacities are possible depending on the loads 590 of the elevator car 503. Of course, larger capacities facilitate storage and longer durations between required recharging. In addition, supercapacitor(s) 570 are also employed to address peak current loading of the elevator car power system 560. For example, motor starting currents for door operator, or ventilation system. The power management system 580 receives power coupled via the power transfer system 565 and provides rectification or conversion as needed to provide for charging the energy storage device(s) .e.g. battery 572 and/or supercapacitor 574 and to supply power to the various loads 590.

In electric control applications, as described herein, battery 572 is required to provide sustained power for long durations. While lead-acid and nickel-metal hydride batteries are more mature battery technologies and may be employed, lithium-ion batteries provide higher energy density, but at relatively low weight. However, despite their high-energy density, batteries 572 by their design typically suffer when required to provide high dynamic currents and as a result they do not exhibit long term cycle life, which makes them less desirable for certain long term applications.

Super capacitors or Ultra-capacitors, 574 commonly referred to as electrochemical double layer capacitors (EDLC) are commercially available in a wide range of sizes up to 5,000 farads. Super capacitor(s) 574 offer highly efficient, high-energy, high-performance power storage and sourcing, even in extreme temperatures. Moreover, they have a long lifespan with little to no maintenance and often outlive the applications they enable. In the energy storage and power management applications of the described embodiments, supercapacitor technology is employed to reduce costs and increases energy efficiency by delivering quick bursts of energy during peak power demands, then quickly storing energy and capturing excess power that would otherwise be lost.

To appreciate the advantages of combining these two technologies, it will be appreciated that the terms energy and power density are expressed in a variety of ways, for example the closely related kW/kg or J/kg. The energy density is a measure of the total energy that a power source is capable of storing and sourcing, and power density is a measure of the rate at which the system can deliver that energy each relative to a given size or mass. Batteries (and even fuel cells, flow batteries etc) both produce/store electrical energy by virtue of a chemical reaction, and, as a result, the rate of energy charging/discharging is limited by the chemical reaction rate, which is influenced by a variety of factors such as concentration of reactants and the internal resistance. Typically, batteries, flow batteries, and fuel cells are capable of delivering enormous amounts of stored energy, but they cannot generally deliver that energy at a high relative rates under heavy load conditions. Conversely, a super capacitor or ultra-capacitor, stores energy in an electrostatic field and when energy is required the field will collapse almost instantaneously with the rate of delivery limited only by the internal resistance and the interconnections.

It should be appreciated then that the effectiveness of the super capacitor depends directly on the ratio of the internal series resistance (denoted ESR) of the super capacitor with respect to the energy source/load as well as the batteries employed. If the internal resistances are roughly equal, the effectiveness is more limited, but ultra-capacitor will help only a small amount. However, if the ESR of the ultra-capacitor low enough, e.g., around an order of magnitude smaller than that of the battery or fuel cell, the effect is more pronounced. Therefore, in an embodiment the energy storage system 570 is configured so that the super capacitor 574 provides/receives the most energy when the loads are initially switched on (e.g., high current rate conditions, and allows the battery 572 is configured to pick up the load gradually to address longer term current requirements. By allowing the battery 572 or fuel cell to gradually take on load, it is insulated from high current transients for charging and discharging, which is beneficial since high reaction rates produce thermal, chemical, and mechanical stresses, which result in faster wear out.

For example, in practice, in an embodiment, the super capacitor 574 provides the initial power for high energy loads, high dynamic current loads (e.g. elevator door initial actuation, HVAC compressor, fan startup, and the like). After an initial selected duration power sourcing is transferred to battery 572. In addition, the battery 572 and the super capacitor transfer power in anticipation of the SOC on each device and loads as shared with the dispatcher. Employing the supercapacitor to provide for the initial loads, e.g., starting loads for doors and HVAC and the like facilitates practical sizing for the battery. It should be understood that if the battery 572 were sized to carry the loads alone, it would most like be problematic and oversized due to its dynamic current limitations.

To be more specific in an example associated with charging, in operation, the elevator car 503 powered by wireless power transfer system 560 as described herein has one unique attribute that exemplifies why a hybrid energy storage system 570 is advantageous. That is, very short stops, commonly on the order of 20 seconds. As such, in this example, the 20 second stop intervals may be the only opportunities to charge the energy storage system, and specifically the battery during peak operating hours for the elevator system 501 and specifically a given elevator car 503. During such operations, in some examples, the overall electrical load 590 for the operation of the elevator car 503 may be as high as 7.5 KW. Passing 7.5 kW of power to a Li-Ion battery in 20 seconds would requires significant oversizing of the battery, conductors, wireless power transfer system 560, and the like to maintain satisfactory reliability and battery lifetimes. An example: for a given 48V battery, power of 7.5 kW would require 156A of charge current. For an appropriately sized battery (by energy storage considerations) on the order of 2000 Wh, (though much smaller on the order of 35 WHr is possible) at recommended charge rate of 40A would require four batteries at that capacity to stay with specifications. That is, using a battery alone would require equipping the elevator car with four times the capacity and weight actually needed to power the car. Employing the super capacitor to carry part of the high dynamic current therefore facilitates reducing battery capacity and weight. Reduced weight yields a more efficient elevator system 501. In addition, employing the hybrid solution with the super capacitor 574 reduces the depth of discharge of the battery as it can provide energy to the load 590. Larger variations in SoC of the battery 572 also reduces reliability and battery life.

Super capacitor 574 increases the hybrid energy storage system's 570 power density and efficiency when compared with batteries 572 or super capacitors 574 alone. Electric motor applications stress batteries more than other applications by requiring more of the available energy in the battery with high current charging and discharge cycles. This leads to increased wear and decreased lifespan for the battery, which then results in a costly replacements. Using the super capacitor 574 aids the battery 572 by eliminating high peaks and valleys in the energy profile for the energy storage system 570. The super capacitor 574 absorbs the power peaks, making the energy storage system 570 more energy efficient and extending the lifetime of the batteries 572. In an embodiment a super capacitor 574 as small as 0.5 Farads is possible, but super capacitors nominally around 5-6 Farads are expected and even as large as 50-100 Farads would facilitate hybrid power system operations for the elevator car 503.

Super capacitor 574 is used to minimize energy loads of selected high current loads 590, and more specifically high dynamic current loads such as the motor or the door operator, motor and blower initiation for the HVAC system, and to absorb the bulk of the wireless power transfer energy. Particularly, for the instances of short duration recharging and power transfer. It should be appreciated that in prior applications the use of the supercapacitor 574 to absorb the initial high current of regeneration or wireless power transfer has not been allocated to the supercapacitor versus the battery 572. For example, in automotive applications, batteries are primarily employed and cooling is required and employed to allow for large currents experienced under initial charging conditions. Cooling solutions are less efficient and require the bulk and weight of a cooling system. Conversely, in the described embodiments, employing the super capacitor facilitates the rapid recharging of the energy storage system 560 without the penalty of a travelling cable and a cooling system on the elevator car 503. The super capacitor 574 buffers inflow and outflow currents as well as work with the varying dispatching schedules to maintain battery 572 state of charge levels as well as maintain sufficient charge for the various elevator car loads 590 such as door openings and onboard systems. Moreover the application of power to the loads 590 may be made as a function of usage that can be modified by the controller 562, 580. Furthermore, in an embodiment, the sizing (voltage) and storage capacity (capacitance) will be determined by and usage patterns of the elevator car 503, which it should be appreciated will most likely be different than if the elevator car loads 590 were directly connected to the AC grid (e.g., 561). More specifically, in the described embodiments, the super capacitor 574 and battery 572 voltages and storages are sized and maintained by the power management system 580 as a function of the dispatching schedule and the SOC of the battery 572. While most systems will only look at the SOC of the battery, allocation of loads, controlling charging and discharging of the batteries, and the like is based on the dispatching schedule for the elevator car 503 provides for more optimal operation of the elevator system 501 as well as improved reliability of the elevator car power system 560. Furthermore, in selected applications, power may also be directed to flow from the battery 572 to super capacitor 574 under selected conditions. For example, in anticipation of the door operator/HVAC/etc. usage.

Super capacitor 574 also enables addressing performance criticisms by enabling battery based energy storage systems (e.g., 570) to reliably complete a million or more charge-discharge cycles, without having to be replaced. Hybridized energy storage and power delivery solutions with both super capacitors and batteries enhance the performance of the energy storage system 570 by meeting the electrical power demands for motor acceleration, deceleration and braking as well as the long term storage and operation requirements for electrical systems.

Continuing with FIG. 5, the power management system 580 also includes controller 562 for controlling and monitoring the charging and discharging of the energy storage system 570 and in particular, battery 572 and/or supercapacitor 574 as needed to ensure the operation of the elevator car (e.g., 203). The controller 562 also directs the application of power from one or more of the energy storage devices, e.g., battery 572 and/or supercapacitor 574 to the individual loads 590 under selected conditions in a manner to optimize the operation of the energy storage system 560 and ultimately the operation of the elevator car (e.g., 203) as was well as other components of the elevator system 201 (FIG. 2). In an embodiment the selected conditions are based at least in part on at least one of an elevator car operating characteristics, elevator system operating characteristics, a rate of current supplied to the one or more of the loads, a state of charge of the first energy storage device e.g., the battery 572 and/or the state of charge of a second energy storage device e.g., the super capacitor 574. Examples of elevator car operating characteristics include dispatching requirements and/or profiles, usage requirements and/or profiles, door operating requirements and/or profiles, HVAC operating requirements and/or profiles and the like.

Figure 6A:
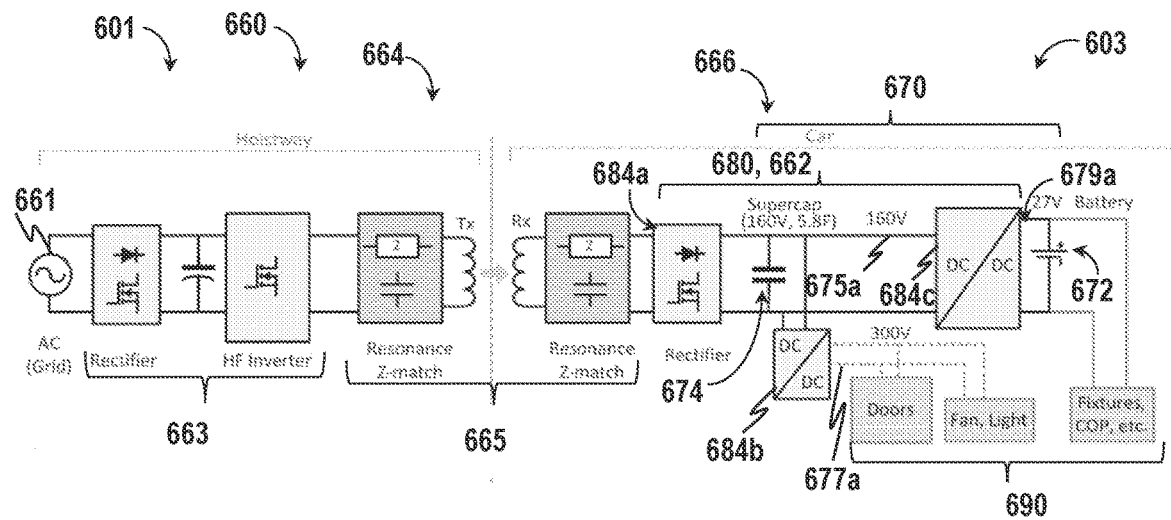
FIG. 6A is a simplified block diagram of an architecture for a hybrid power system on an elevator car in accordance with an embodiment.
Figure 6B:
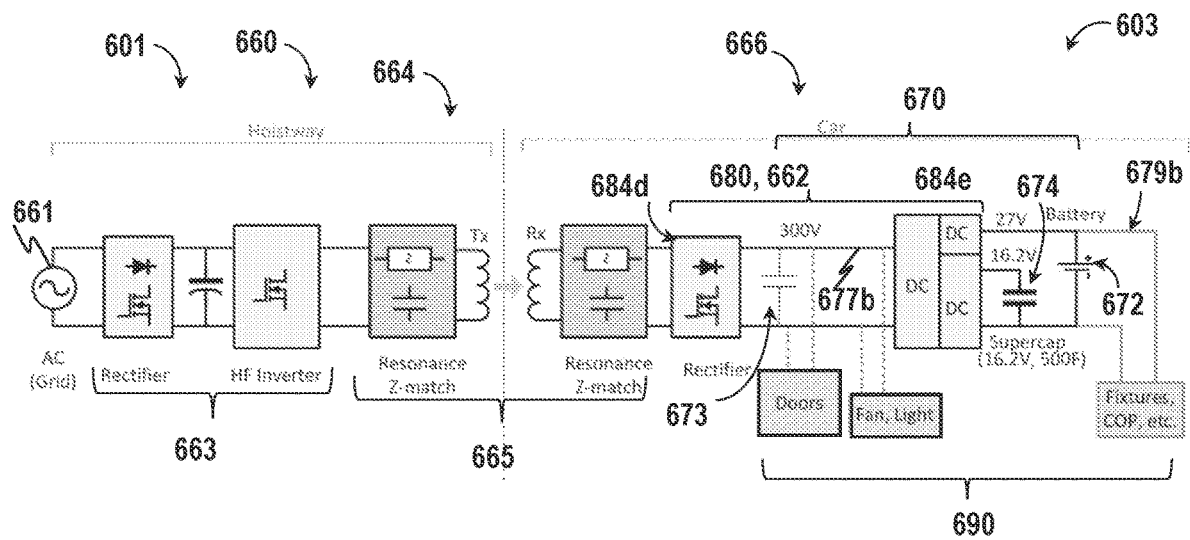
FIG. 6B is a simplified block diagram of an architecture for a hybrid power system on an elevator car in accordance with an embodiment.

Turning now to FIGS. 6A and 6B depicting simplified schematic illustrations of additional embodiments of an elevator car power system 660 with hybrid energy storage system 670. In an embodiment, two example architectures are described and depicted. The two architectures described integrate the combination higher power density (e.g. supercapacitor) and higher energy density (e.g. battery) components as described herein. While a particular architecture is depicted it should be appreciated that similar concepts can be extended to various other hybrid storage systems as well. In the first architecture, as depicted in FIG. 6A, the supercapacitor 674 is employed to store the energy directly from the source (the converter 684a and/or from the stationary portion 664), at a higher potential; that is subsequently interfaced to a battery 672 with a bi-directional dc-dc converter at a lower potential. In this architecture, the battery 672 supply is used to provide power to suitable low voltage loads (Fixtures, controller, etc). while the high voltage loads are interfaced from the super capacitor and battery common bus by a dc-to-dc or dc-to-ac converter to power door, fan, light and other loads. Similarly, in the second architecture, as depicted in FIG. 6B, a multi-port converter 684 is employed to source energy to battery and source via a multi-port bi-directional dc-to-dc converter. The various loads are powered by suitable power conversions.

It should be appreciated that the benefits of the described architectures are a more optimal design and integration of hybrid energy storage devices in a system that can be charged in peak charging mode or normal charging mode as per the window of charging during various operational modes of the elevator system (e.g., 601) and more specifically the elevator car 603. This results in cost reductions, size reduction of the energy storage devices and well as the charging/conversion devices in the system. Furthermore, it also allows to achieve long life time of the storage components by allocating loading and operation to the energy storage devices based on their operational capabilities.

FIG. 6A depicts a simplified schematic illustrating an embodiments of an elevator car power system 660 with hybrid energy storage system 670. Once again, the elevator car power system 660 includes a fixed or stationary portion shown generally as 664 configured and mounted in the hoistway/elevator shaft (e.g., 117 FIG. 1) as needed and a moving portion, shown generally as 666, mounted and installed with the elevator car 603 and/or the counterweight (e.g., 105 FIG. 1). In this embodiment the stationary portion 664 and the transmission of power via the wireless power transfer system 665 to the moving portion 666 of the elevator car power system 660 is similar to that described previously herein with the reference numerals incremented accordingly.

Continuing with FIG. 6A, the elevator car power system 660 includes, but are not limited to an energy storage system shown generally as 670 and a power management system shown generally as 680 configured to control power to various loads on the elevator car 603. Once again, the energy storage system 670 may include various energy storage devices including, but not limited to batteries 672 operably coupled with one or more super capacitors 674. The energy storage system 670 may include other storage devices as described herein. The power management system 680 receives power coupled via the power transfer system 665 and provides rectification or conversion in converter(s)s 684a, as needed to provide for charging the energy storage device(s) e.g., battery 672 and/or supercapacitor 674 and to supply power to the various loads 690. In this embodiment, converter 684a receives power from the power transfer system 674 and provides a high voltage DC bus 675.

Continuing with FIG. 6A, the power management system 680 also includes one or more controller(s) 662 for controlling and monitoring the various converters 684a, 684b, 584c for charging and discharging of the energy storage system 670 and in particular, battery 672 and/or supercapacitor 674 as needed to ensure the operation of the elevator car (e.g., 603). The controller 662 also directs the application of power from one or more of the energy storage devices, e.g., battery 672 and/or supercapacitor 674 to the individual loads 690 in a manner to optimize the operation of the energy storage system 660 and ultimately the operation of the elevator car 603 (e.g., 203) as was well as other components of the elevator system 601. In an embodiment, the controller 662 is integral with one or more converters e.g., 684a, 684b, 684c. In another embodiment, the various converters may be integral with one or more controller(s) 662 as described herein.

Continuing with FIG. 6A, in this embodiment, converter 684a receives power from the power transfer system 674 and provides DC power to a DC bus 675 and the super capacitor 674. In an embodiment, the DC bus supported by the super capacitor 674 is then employed to supply all of the loads 690 associated with the elevator car 603. For example, in an embodiment, high voltage high energy loads such the motor load of the door operator, ventilation fans, lighting, and the like are powered by a high voltage DC bus 677a supplied through a DC/DC converter 684b. In an embodiment, the high voltage loads are powered at 300VDC, though other voltages and configurations are possible. In addition, the DC bus 675, while depicted as 160VDC could be other voltages including as high as the high voltage DC bus 677a depending on the size and capabilities of the converter 684a and super capacitor 674 and the like. In addition, also connected to the DC bus 675 is a bidirectional DC/DC converter 684c configured to form and supply a low voltage DC bus 679 configured to charge the battery 672 and to power low voltage loads such as fixtures, in the elevator car, a car operating panel and the like. In an embodiment, the low voltage bus 679 is maintained at 27VDC by the DC/DC converter 684c. The battery can also be discharged via the bidirectional DC/DC converter to supply the DC bus 675 as needed at a controlled current rate to recharge the super capacitor 674 and provides for the other loads 690 via converter 684b. Finally, while a particular allocation of functions are depicted, it should be appreciated that the particular allocation may be made based on the dispatching of the elevator car and past/current usage so that a desired SoC is maintained on each storage device 570 e.g., battery 572 and super capacitor 574 in anticipation of each need to minimize the energy conversion losses as informed by the elevator dispatcher and SoC information.

FIG. 6B depicts a simplified schematic illustrating another embodiment of an elevator car power system 660 with hybrid energy storage system 670. Once again, the elevator car power system 660 includes a fixed or stationary portion shown generally as 664 configured and mounted in the hoistway/elevator shaft (e.g., 117 FIG. 1) as needed and a moving portion, shown generally as 666, mounted and installed with the elevator car 603 and/or the counterweight (e.g., 105 FIG. 1). In this embodiment the stationary portion 664 and the transmission of power via the wireless power transfer system 665 to the moving portion 666 of the elevator car power system 660 is similar to that described previously herein.

Continuing with FIG. 6B, the elevator car power system 660 includes, but are not limited to an energy storage system 670 and a power management system 680 configured to control power to various loads on the elevator car 603. Once again, the energy storage system 670 may include various energy storage devices including, but not limited to batteries 672 operably coupled with one or more super capacitors 674. As described herein, the power management system 680 receives power coupled via the power transfer system 665 and provides rectification or conversion in converter(s)s 684*d*, as needed to provide for charging the energy storage device(s) .e.g., battery 672 and/or supercapacitor 674 and to supply power to the various loads 690. In this embodiment, converter 684*a* receives power from the power transfer system 674 and provides a high voltage DC bus 675*b*.

The power management system 680 also includes one or more controller(s) 662 for controlling and monitoring the various converters 684*d*, 684*e*, for charging and discharging of the energy storage system 670 and in particular, battery 672 and/or supercapacitor 674 as needed to ensure the operation of the elevator car (e.g., 603). The controller 662 also directs the application of power from one or more of the energy storage devices, e.g., battery 672 and/or supercapacitor 674 to the individual loads 690 in a manner to optimize the operation of the energy storage system 660 and ultimately the operation of the elevator car 603 (e.g., 203) as was well as other components of the elevator system 601. Once again, in an embodiment, the controller 662 maybe integral with one or more of the converters e.g., 684*d*, 684*e*. Likewise, in another embodiment, the various converters 684 may be integral with one or more controller(s) 662 as described herein.

Continuing with FIG. 6B, in this embodiment, converter 684*d* receives power from the power transfer system 674 and provides DC power to a high voltage DC bus 677*b* and a high voltage storage capacitor 673. In an embodiment, the high voltage DC bus 677*b* supported by the capacitor 673 is then employed to supply all of the loads 690 whether directly or indirectly, associated with the elevator car 603. For example, in an embodiment, high voltage high energy loads 690 such the motor load of the door operator, ventilation fans, lighting, and the like are powered directly by the high voltage DC bus 677*b*. In an embodiment, the high voltage loads are powered at 300VDC, though other voltages are possible. In addition, the DC bus 677*b*, while depicted as 300VDC could be other voltages depending on the size and capabilities of the converter 684*d* and capacitor 673 as well as the loads directly connected to the high voltage bus 677*b*, and the like. In addition, also connected to the high voltage DC bus 677*b* is a bidirectional multiport DC/DC converter 684*e* configured to form and supply a low voltage DC bus 679*b* configured to charge the battery 672 and to power low voltage loads such as fixtures, in the elevator car, a car operating panel and the like. In an embodiment, the low voltage bus 679 is maintained at 27VDC by the DC/DC converter 684*c*. The battery can also be discharged via the bidirectional DC/DC converter to supply the DC bus 675 as needed at a controlled current rate to recharge the super capacitor 674 and provides for the other loads 690 via converter 684*b*. An additional output of the multiport converter 684*e* charges the super capacitor 674. Under selected conditions, the super capacitor is then employed to provide power that is converted to supply the high voltage DC bus 677*b* and the loads 690 attached thereto. Once again, while a particular allocation of functions are depicted, it should be appreciated that the particular allocation may be made based on the dispatching of the elevator car and past/current usage so that a desired SoC is maintained on each storage device 570 e.g., battery 572 and super capacitor 574 as described herein.

Figure 7:
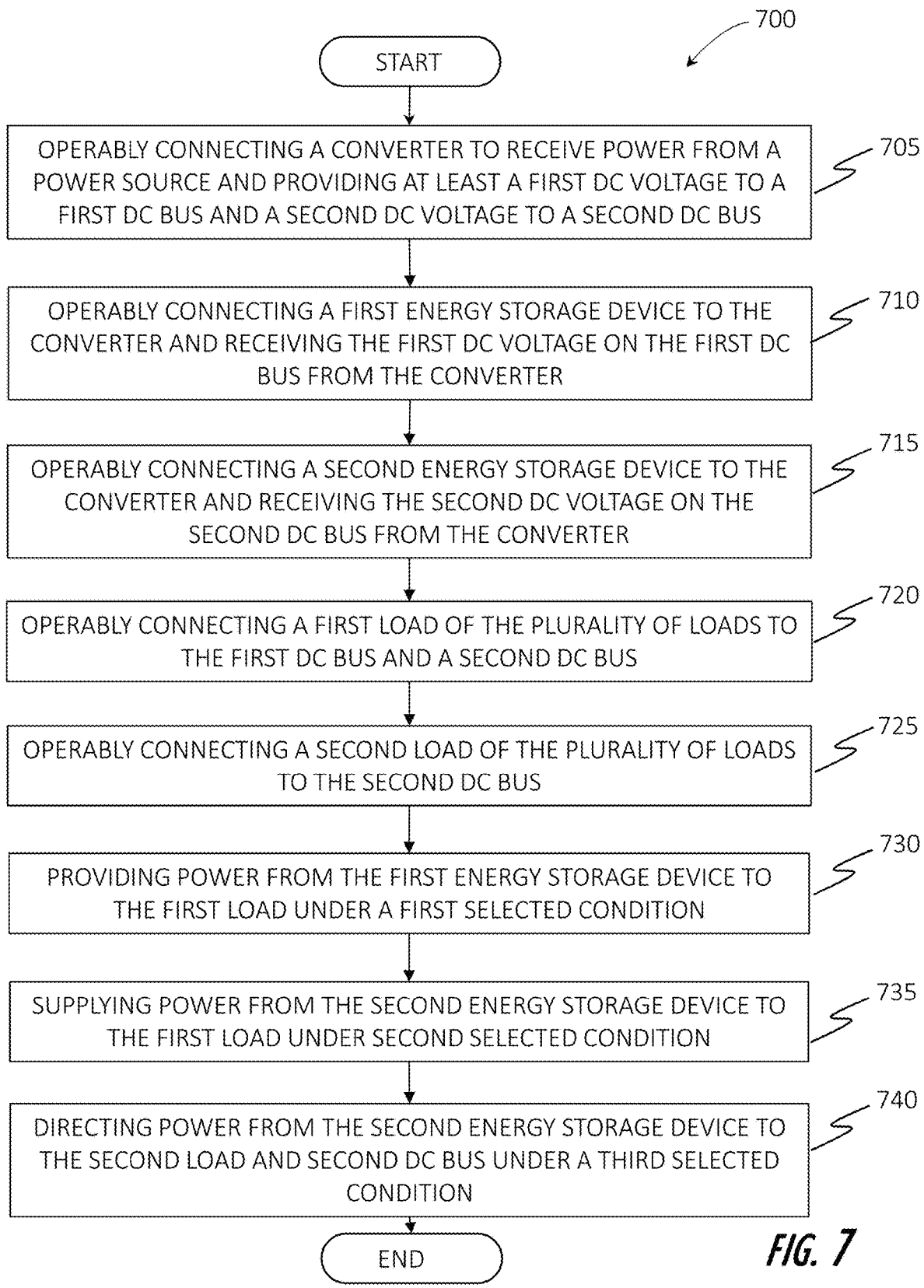
FIG. 7 is a simplified flowchart of a method in accordance with an embodiment of the present disclosure.

FIG. 7 depicts a flowchart of a method of configuring a hybrid energy storage system in accordance with an embodiment. The method 700 initiates with step 705 and operably connecting a converter 580 disposed on the elevator car 503 to receive power from a power source 561 and providing at least a first DC voltage to a first DC bus and a second DC voltage to a second DC bus. At process step 710 the method continues with operably connecting a first energy storage device 574 to the converter 580 and receiving the first DC voltage on the first DC bus from the converter 580. In an embodiment, the first energy storage device 574 is the supercapacitor 574. A second energy storage device 572 is connected to the converter 580 and receiving the second DC voltage on the second DC bus from the converter 580 as depicted at process step 715. The method 700 continues as depicted at process step 720 with operably connecting a first load of the plurality of loads 590 to the first DC bus and a second DC bus. Likewise, at process step 725 a second load of the plurality of loads 590 is operably connected to the second DC bus. The method 700 continues at process step 730 with providing power from the first energy storage device 574 to the first load 590 under a first selected condition. In addition, at process step 735, supplying power from the second energy storage device 572 to the first load 590 under second selected condition, and finally directing power from the second energy storage device to the second load and second DC bus under a third selected condition as depicted at process step 740.

It should be appreciated that in the described embodiments a particular topology/architecture is described including the particular connections for the battery 572 and super capacitor 574 as well as a selected allocation of loads 590 respectively. It should also be appreciated that while a given load 590 may be described as being allocated and powered by the super capacitor (e.g. door operator motor and fan loads), such loads 590 could also be allocated to the battery 572. However, such allocation will depend on a variety of factors such as the current usage profile the operating profiles of the elevator car 603, and the voltage levels required by the fan, and the like. As will be understood, there are a myriad of voltages and DC/AC variations possible, so a selected allocation may depend on the losses through conversions for a given architecture and what is optimal for component layout as well as those component costs. Moreover, many businesses are broken into pillars operation so their particular usage of the elevator cars 603 may vary, and thus one businesses local optimization of costs may be different than another. As a result the particular architecture and allocation may also be a function of a usage profile for a given elevator car 603 based on how the particular business operates. Finally, while a particular allocation of functions are depicted, it should be appreciated that the particular allocation may be made based on the dispatching of the elevator car and past/current usage so that a desired SoC is maintained on each storage device 570 e.g., battery 572 and super capacitor 574 in anticipation of each need to minimize the energy conversion losses as informed by the elevator dispatcher and SoC information.

As described above, embodiments can be in the form of processor implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

Aspects of the disclosure have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof. Finally, the term "about" is intended to include the degree of error associated with measurement of the particular quantity and/or manufacturing tolerances based upon the equipment available at the time of filing the application.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A hybrid energy storage system for an elevator car, the system comprising:
    a converter operably connected to receive power from a power source and provide a first voltage to a first energy source device and provide a second voltage to a second energy source device;
    the first energy storage device having a first internal resistance;
    the second energy storage device having a second internal resistance;
    wherein the second internal resistance is less than the first internal resistance;
    wherein the first energy source device and the second energy storage device are operably connected to a first load having first power demands, the first load associated with the elevator car;
    wherein the first energy source device is operable to supply a first portion of the first power demands;
    wherein the second energy storage device is operable to supply a second portion of the first power demands; and
    wherein the second internal resistance being less than the first internal resistance enables the first portion of the first power demands to be less than the second portion of the first power demands.

2. The hybrid energy storage system of claim 1, wherein:
    the first energy storage device and the second energy storage device are operable to communicate electronically with a power management system;
    the power management system is operable to control the first portion of the first power demands and the second portion of the first power demands under selected conditions;
    the first power demands comprise current; and
    the selected conditions comprise a first selected condition comprising a first type of change in a rate of the current supplied to the first load.

3. The hybrid energy storage system of claim 1, wherein:
    the power management system is operable to control the first energy storage device to provide power to the second energy storage device under selected conditions; and
    the selected conditions comprise a first selected condition comprising a predetermined period of time before an anticipated initiation of the first power demands of the load.

4. The hybrid energy storage system of claim 2, wherein the first selected condition is based at least in part on at least one of an elevator car operating characteristic, an elevator system operating characteristic, the rate of current supplied to the load, a state of charge of the first energy storage device, and a state of charge of the second energy storage device.

5. The hybrid energy storage system of claim 2, wherein the first selected condition comprises an elevator system operating condition comprising a dispatching history for the elevator car,.

6. The hybrid energy storage system of claim 2, wherein the first selected condition comprises an elevator system operating characteristic comprising a dispatching requirement for the elevator car and a dispatching history for the elevator car.

7. The hybrid energy storage system of claim 1, wherein the first energy storage device icomprises a battery, the battery exhibiting a storage capacity of at least 30 WHr.

8. The hybrid energy storage system of claim 7, wherein the battery iscomprises at least one of lead-acid, Ni-Cd, NiMH, or Li-Ion.

9. The hybrid energy storage system of claim 1, wherein the second energy storage device comprises a super capacitor, the super capacitor exhibiting a capacitance of at least 0.5 Farads.

10. A method of providing power to a plurality of loads for an elevator car with a hybrid energy storage, the method comprising:
using a converter to receive power from a power source and provide a first voltage to a first energy source device and provide a second voltage to a second energy source device;
wherein the first energy storage device includes a first internal resistance;
wherein the second energy storage device includes a second internal resistance;
wherein the second internal resistance is less than the first internal resistance;
wherein the first energy source device and the second energy storage device are operably connected to a first load having first power demands, the first load associated with the elevator car;
using the first energy source device to supply a first portion of the first power demands; and
using the second energy storage device to supply a second portion of the first power demands;
wherein the second internal resistance being less than the first internal resistance enables the first portion of the first power demands to be less than the second portion of the first power demands.

11. The method of providing power on an elevator car of claim 10, wherein:
the first energy storage device and the second energy storage device are operable to communicate electronically with a power management system;
the power management system is operable to control the first portion of the first power demands and the second portion of the first power demands under selected conditions;
the first power demands comprise current; and
the selected conditions comprise a first selected condition comprising a first type of change in a rate of the current supplied to the first load.

12. The method of providing power on an elevator car of claim 10, wherein:
the power management system is operable to control the first energy storage device to provide power to the second energy storage device under selected conditions; and
the selected conditions comprise a first selected condition comprising a predetermined period of time before an anticipated initiation of the first power demands of the load.

13. The method of providing power on an elevator car of claim 11, wherein the first selected condition is based at least in part on at least one of an elevator car operating characteristic, an elevator system operating characteristic, the rate of current supplied to the load, a state of charge of the first energy storage device, and a state of charge of the second energy storage device.

14. The method of providing power on an elevator car of claim 11, wherein the first selected condition comprises an elevator system operating condition comprising a dispatching history for the elevator car.

15. The method of providing power on an elevator car of claim 11, wherein the first selected condition comprises an elevator system operating characteristic.

16. The method of providing power on an elevator car of claim 10, wherein the first energy storage device is-comprises a battery, the battery exhibiting a storage capacity of at least 30 WHr.

17. The method of providing power on an elevator car of claim 16, wherein the battery iscomprises at least one of lead-acid, NiCd, NiMH, or Li-Ion.

18. The method of providing power on an elevator car of claim 10, wherein the second energy storage device comprises a super capacitor, the super capacitor exhibiting a capacitance of at least 0.5 Farads.

* * * * *